No. 620,252. Patented Feb. 28, 1899.
E. E. PRESTON & C. E. SIBSON.
PNEUMATIC TIRE AND RIM FOR CYCLE OR OTHER WHEELS.
(Application filed Mar. 17, 1898.)
(No Model.)
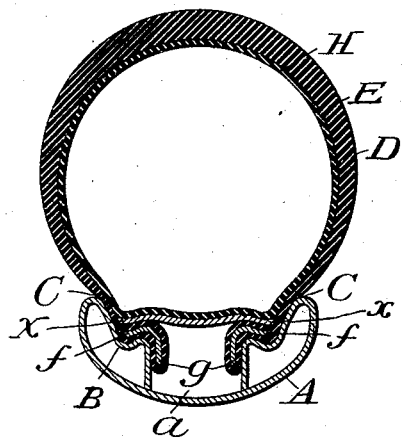
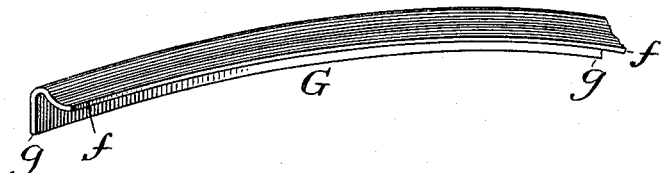
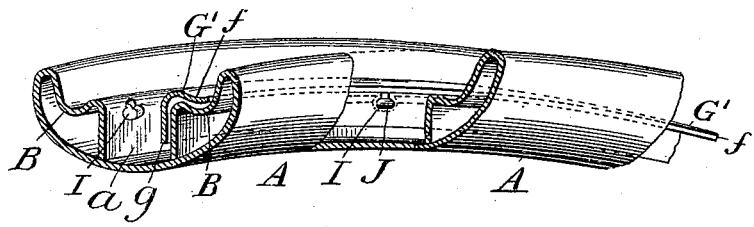

UNITED STATES PATENT OFFICE.

EDWARD EVERARD PRESTON AND CHARLES EDWARD SIBSON, OF LEICESTER, ENGLAND.

PNEUMATIC TIRE AND RIM FOR CYCLE OR OTHER WHEELS.

SPECIFICATION forming part of Letters Patent No. 620,252, dated February 28, 1899.

Application filed March 17, 1898. Serial No. 674,253. (No model.)

*To all whom it may concern:*

Be it known that we, EDWARD EVERARD PRESTON, of No. 20 Gerrard street, and CHARLES EDWARD SIBSON, of No. 5 East Bond street, Leicester, in the county of Leicester, England, subjects of Her Britannic Majesty Queen Victoria, have invented certain new and useful Improvements in or Relating to Pneumatic Tires and Rims for Cycle or other Wheels; and we do hereby declare the following to be a full, clear, and exact description of the invention, such as will enable others skilled in the art to which it appertains to make and use the same.

This invention refers to improvements in or relating to pneumatic tires and rims for cycles or other wheels, and has for its object the arrangement of the combined parts, which shall be secure and obviate the difficulty now experienced in wired, ring, or band held tires. We attain these objects by the devices illustrated in the accompanying drawings, in which—

Figure 1 is a sectional view of the pneumatic tire held in position on the wheel-rim. Fig. 2 shows a section in plan of the angular-shaped or concave-faced band G employed within the edges of the outer cover of the tire; and Fig. 3, a partly-sectional view of a metal wheel-rim and a modified arrangement of the concave-faced band G', hereinafter described.

According to our invention we employ a metal or wood wheel-rim A, trough shape in section and formed with angular-shaped beadings B, turned inward, preferably flat on their outward periphery.

In the edges C of the outer cover D, which is composed of a fabric lining E and rubber cover, we place the bands G, made of steel or other suitable material, with their inside edges *g* turned downward to form a hook-shaped beading and their outside angular edges *f* corresponding to the concave faces of the wheel-rim. They are formed to the shape desired by running the strips through suitable wheels, which turns them to right angles, concaves, and arches them at the same time. When the air-tube H is inflated by the ordinary means of a valve and air-pump, the said angular-shaped or concave-faced bands grip their corresponding beadings and so secure the fabric-lined outer cover firmly to the wheel-rim. It will be well understood that the angular-shaped or concave-faced bands resting upon the concavity and well up to the sides of the wheel-rim do not or are they liable to float, like inextensible wires or their equivalents, the tire, in fact, not depending upon the continuity of the angular-shaped or concave-faced bands, thus making the holding action of the concave bands and their angular-shaped beads perfectly secure even if such bands become damaged or are in sections, whether long or short or in a quantity to complete the circumference of the wheel-rim, the whole pressure (upon the inflation of the air-tube) being exerted in the direction of the two corners of the angular-shaped beadings and the vertical sides of the wheel-rim without the aid of additional fastenings. It will be obvious to any one that to release the edge of the cover of the tire upon deflation it has to be pressed forward and inward and dropped into the channel *a* of the rim, which is made wide enough for the purpose, the said angular and concave-faced bands being also independent of wires or wedges or inextensible edges of a pneumatic-tire cover held by lateral flanges.

In practice the thick line X under the air-tube, Fig. 1, represents a stiffened flap which covers the angular-shaped beadings of the rim to prevent pinching or to allow the bottom of the air-tube entering the channel *a*.

In the modification, Fig. 3, the slots I are made through the beadings, not through the outer face of the rim, and the concave-faced bands G' fitted with studs or buttons J on their under side, fitting vertically, so that when the air-tube placed in the outer cover is deflated the studs or buttons will be easily pushed out of the slots I and the bands G' over their beadings and carry the cover into the channel *a*, so that the air-tube can be readily removed therefrom. Upon inflation of the air-tube the bands are forced downward onto their angular beadings without abutting against or held under the undercut lip of the rim, as is now the case. We may make the bands G' in sections and place the stud or button in about the center of each. The properties of the angular-shaped bands are that if they become broken in any way the tire will still be a good ridable tire, which cannot be the case in inextensible wires and rings as are now known.

We are aware that fastening-rings, zigzag wires, and parallel undercut lipped and slotted rims have been employed for rings, rods, or studs to abut against; but we make no claim to these as such; but

What we claim is—

1. A pneumatic tire and rim comprising a cover and its lining, right-angled angular concaved-faced bands enveloped within the edges of the lining of the cover, and engage with corresponding angular-shaped beadings formed within the rim upon the inflation and expansion of the air-tube placed within the cover; a channel formed in the bottom of the rim to enable one of the right-angled angular concaved-faced bands to be pushed off its seating upon the deflation of the air-tube to immediately release the same, a stiffened flap to prevent the air-tube from pinch, all substantially as described.

2. A pneumatic tire and rim comprising a cover and its lining, angular concaved-faced bands either in sections or completing the circle, studs or buttons fixed to their under sides to engage with recesses through angular-shaped beadings formed within the rim upon the inflation and expansion of the air-tube placed within the cover, a channel formed in the bottom of the rim to enable one of the angular concaved bands to be pushed from off its seating and the studs from their fastenings upon the deflation of the air-tube, all substantially as described.

In testimony whereof we affix our signatures in presence of witnesses.

EDWARD EVERARD PRESTON.
CHARLES EDWARD SIBSON.

Witnesses:
GEORGE WILLIAM COLTMAN,
FREDERICK JAMES BATES.